United States Patent
Koizumi et al.

[11] 4,077,704
[45] Mar. 7, 1978

[54] REPRODUCING OBJECTIVE FOR VIDEO DISKS

[75] Inventors: Toshimichi Koizumi, Sagamihara; Miwako Unami, Yokohama, both of Japan

[73] Assignee: Olympus Optical Co., Ltd., Japan

[21] Appl. No.: 724,767

[22] Filed: Sep. 20, 1976

[30] Foreign Application Priority Data

Sep. 25, 1975 Japan .................. 50-115811

[51] Int. Cl.² .............................. G02B 9/60
[52] U.S. Cl. .................. 350/218; 350/175 ML
[58] Field of Search .............. 350/218, 175 ML

[56] References Cited

U.S. PATENT DOCUMENTS 3,744,881  7/1973  Taira ........................ 350/218
3,925,910  12/1975  Matsubara .................. 350/218

Primary Examiner—Conrad J. Clark
Attorney, Agent, or Firm—Cushman, Darby & Cushman

[57] ABSTRACT

A reproducing objective for video disks comprising five single lenses for which the working distance is large and flatness of image and resolving power are high.

6 Claims, 27 Drawing Figures

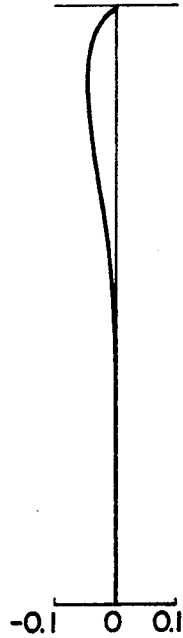
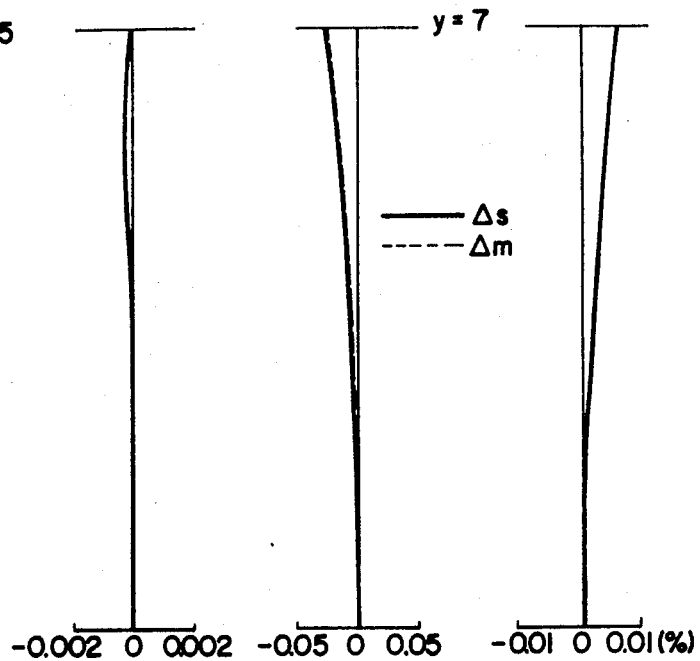
FIG. 2A SPHERICAL ABERRATION
FIG. 2B OSC'
FIG. 2C ASTIGMATISM
FIG. 2D DISTORTION
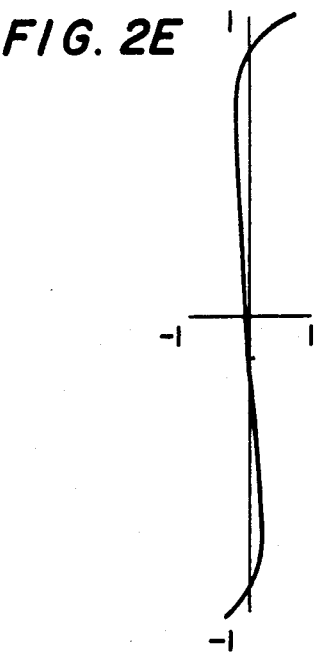
FIG. 2E COMA

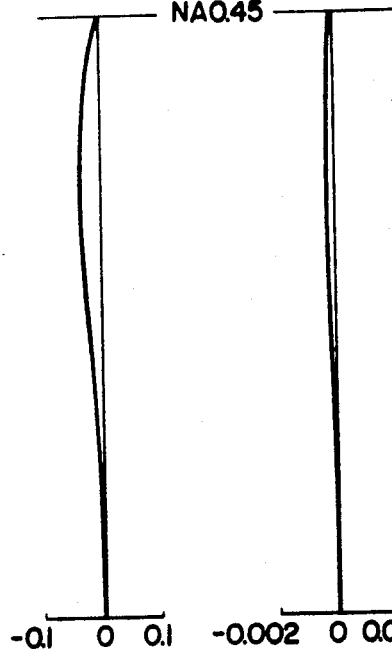
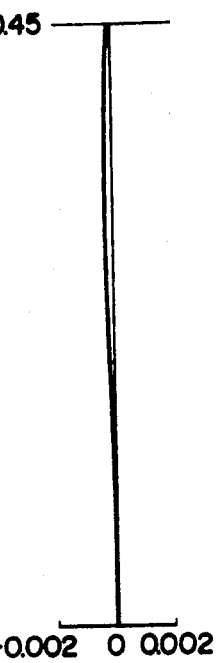
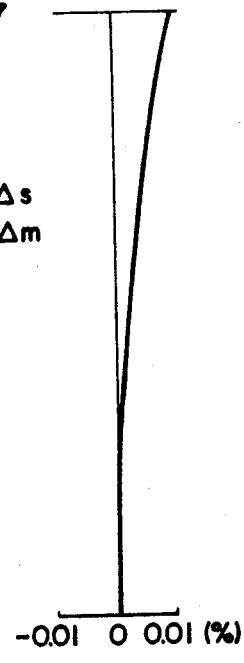
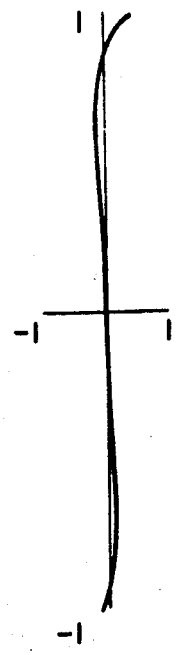

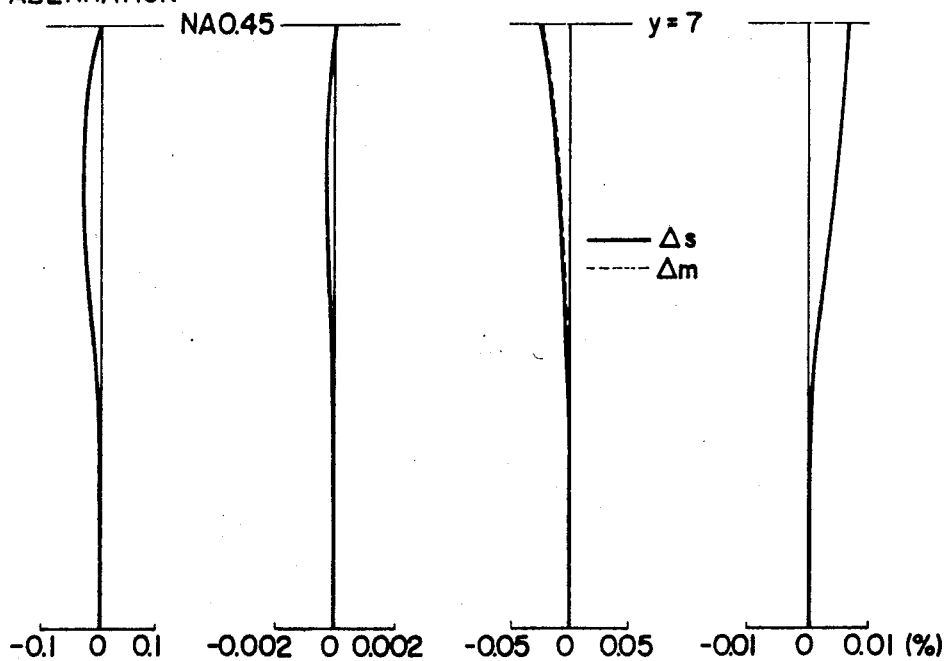
FIG. 4A SPHERICAL ABERRATION
FIG. 4B OSC'
FIG. 4C ASTIGMATISM
FIG. 4D DISTORTION
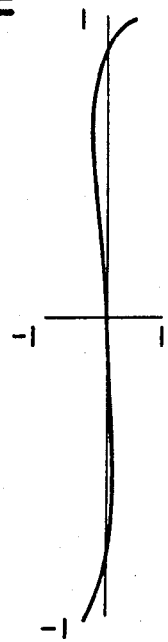
FIG. 4E COMA

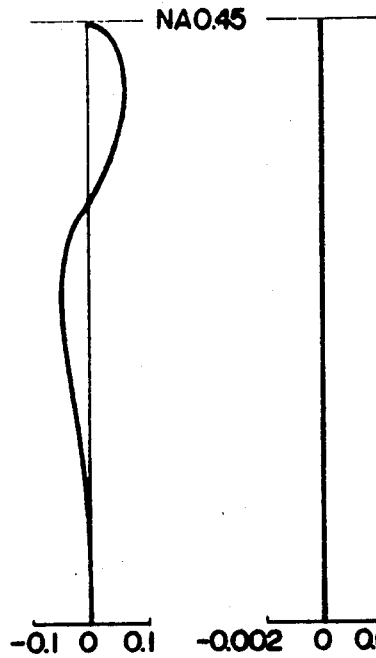
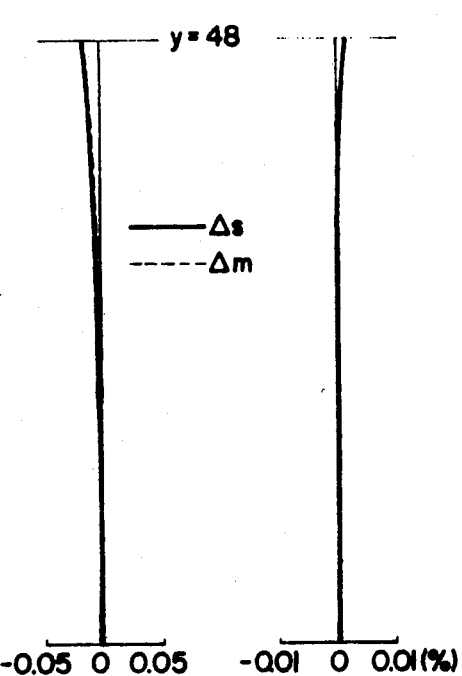
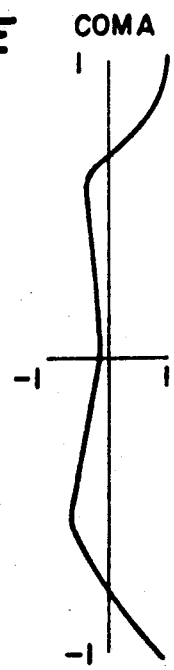
FIG. 6A SPHERICAL ABERRATION
FIG. 6B OSC'
FIG. 6C ASTIGMATISM
FIG. 6D DISTORTION
FIG. 6E COMA FIG. 7A SPHERICAL ABERRATION
FIG. 7B OSC'
FIG. 7C ASTIGMATISM
FIG. 7D DISTORTION
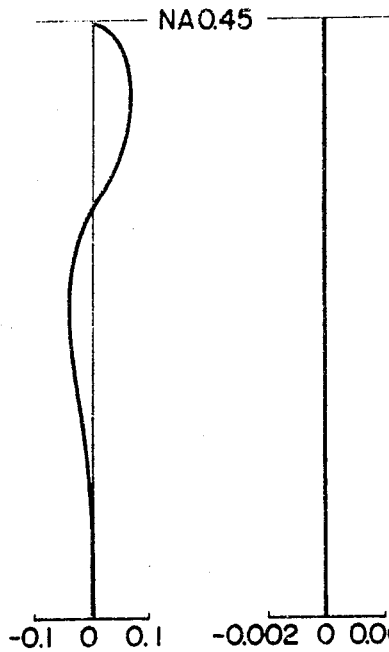
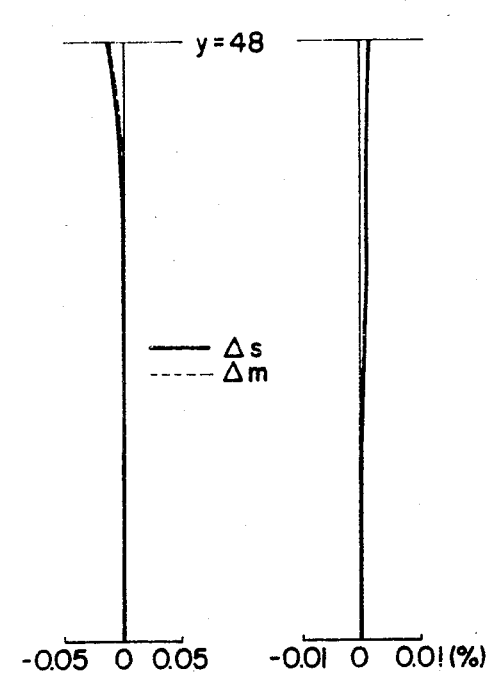
FIG. 7E COMA
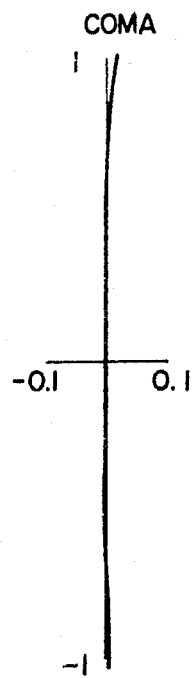

REPRODUCING OBJECTIVE FOR VIDEO DISKS

BACKGROUND OF THE INVENTION

1. Field of the invention

The present invention relates to a reproducing objective for video disks and, more particularly, to a reproducing objective for reading out the signals recorded on high-density information-recording disks (video disks).

2. Description of the prior art

For objectives to be used in reproducing systems for video disks, it is required to warrant resolving power of 1 $\mu$ due to the fact that the objective has to read out very small signals recorded with high density. Moreover, the information read out from the disk, which rotates at high speed, contains information for making the objective follow up the recorded track and information for automatic focusing in addition to image information. To make the objective read out those kinds of information correctly, the flatness of image focused by the objective should be high. To prevent breakage of the video disk and objective which will be caused when the objective contacts the video disk, the working distance of the objective should be long. Besides, to perform automatic focusing, the objective should be compact and light in weight. Moreover, the price of the objective should be low. As the light used for the objective for video disks is generally a monochromatic light ([. = 632.8 mm), it is effective for eliminating the noise at the time of amplifying the signals from a detector when transparency for the light of this wavelength is as high as possible. Therefore, to make transparency high, it is necessary to provide multi-layer anti-reflection coating on the lens surfaces or to make the number of lenses constituting the objective as small as possible. When this problem is considered in connection with the above-mentioned other requirements such as low price and light weight, it is more advantageous when the number of lenses constituting the objective is made as small as possible.

SUMMARY OF THE INVENTION

It is, therefore, a primary object of the present invention, to provide a reproducing objective for video disks for which the working distance is large, flatness of image is high and resolving power is high. For the objective according to the present invention, the Gauss type lens configuration is adopted as it is easier to obtain a large working distance and high flatness of image by the Gauss type lens configuration. As shown in FIG. 1, the objective for video disks according to the present invention is a modified Gauss type lens system comprising five single lenses, i.e., a first, second, third, fourth and fifth lenses. The first lens is a positive lens with its planar or concave surface positioned toward the object side, the second lens is a positive lens, the third lens is a negative meniscus lens with its convex surface positioned toward the object side, the fourth lens is a negative meniscus lens with its concave surface positioned toward the object side, and the fifth lens is a positive meniscus lens with its concave surface positioned toward the object side. Besides, the objective for video disks according to the present invention satisfies the following conditions when reference symbol $f$ represents the focal length of the lens system as a whole, reference symbol $f_3$ represents the focal length of the third lens, reference symbol $f_4$ represents the focal length of the fourth lens, reference symbol $r_6$ represents the radius of curvature of the surface on the image side of the third lens, reference symbol $r_7$ represents the radius of curvature of the surface on the object side of the fourth lens, reference symbol $d_1$ represents the thickness of the first lens, and reference symbol $d_5$ represents the thickness of the third lens.

1. $0.30 \geq r_6/f \geq 0.23$

2. $0.38 \geq d_1/f \geq 0.26$

3. $1.4 \geq r_6/|r_7| \geq 0.9$

4. $6.0 \geq |f_3|/|f_4| \geq 2.5$

5. $0.31 \geq d_5/f \geq 0.21$

When, in the lens system of the above-mentioned configuration, $r_6/f$ becomes larger than the upper limit of the condition (1), i.e., $r_6/f > 0.3$, distortion will increase and spherical aberration in the zonal and marginal portions will be overcorrected. When, on the contrary, $r_6/f$ becomes smaller than the lower limit, i.e., $r_6/f < 0.23$, astigmatism will be undercorrected. When $d_1/f$ in the condition (2) becomes $d_1/f > 0.38$, the working distance becomes short and it becomes impossible to attain the object of the present invention. Moreover, spherical aberration will be undercorrected and astigmatic difference becomes large. When, on the contrary, it becomes $d_1/f < 0.26$ coma and spherical aberration in the marginal portion will become unfavourable though the working distance becomes large.

If it becomes $r_6/|r_7| > 1.4$ in the condition (3), spherical aberration and coma will be overcorrected. If it becomes $r_6/r_7 > 0.9$, coma will be somewhat undercorrected. If it becomes $|f_3|/|f_4| < 2.5$ in the condition (4), coma and spherical aberration in the marginal portion will become large. If it becomes $|f_3|/|f_4| > 6.0$, symmetry of coma will become unfavourable. Moreover, astigmatism will be undercorrected and will increase in negative direction toward the marginal portion. If, in the condition (5), it becomes $d_5/f > 0.31$, spherical aberration will be somewhat overcorrected and, at the same time, astigmatic difference becomes large. If, on the contrary, it becomes $d_5/f < 0.21$, coma will be somewhat overcorrected. As described in the above, by the objective according to the present invention, it is possible to attain the object of the present invention. For the objective according to the present invention, it is more preferable to use materials of high refractive indices for the third and fourth lenses due to the following reason. That is, in order to favourably correct curvature of field, coma, etc. of the lens system, it is unavoidable to arrange so that radii of curvature $r_6$ and $r_7$ of the surface on the image side of the third lens and surface on the object side of the fourth lens respectively become small. When, however, refractive indices of these lenses are high, it is possible to make radii of curvatures $r_6$ and $r_7$ larger compared with the case that these refractive indices are low. As a result, it becomes easier to manufacture these lenses and the cost of production is reduced accordingly. Therefore, for refractive indices $n_3$ and $n_4$ of the third and fourth lenses, it is more preferable to make them $n_3 \geq 1.6$ and $n_4 \geq 1.6$.

BRIEF DESCRIPTION OF THE DRAWINGS

FIGS. 2A, 2B, 2C, 2D and 2E respectively show graphs illustrating aberration curves of Embodiment 1;

FIGS. 3A, 3B, 3C, 3D and 3E respectively show graphs illustrating aberration curves of Embodiment 2;

FIGS. 4A, 4B, 4C, 4D and 4E respectively show graphs illustrating aberration curves of Embodiment 3;

FIGS. 6A, 6B, 6C, 6D and 6E respectively show graphs illustrating aberration curves of Embodiment 4; and FIGS. 7A, 7B, 7C, 7D and 7E respectively show graphs illustrating aberration curves of Embodiment 5.

DETAILED DESCRIPTION OF THE PREFERRED EMBODIMENTS

Preferred embodiments of the reproducing objective for video disks according to the present invention are as shown below.

Embodiment 1

$r_1 = \infty$
$d_1 = 0.2825$ $n_1 = 1.51463$ $\nu_1 = 64.2$
$r_2 = -0.5927$
$d_2 = 0.025$
$r_3 = 1.1536$
$d_3 = 0.1969$ $n_2 = 1.51463$ $\nu_2 = 64.2$
$r_4 = -0.895$
$d_4 = 0.1154$
$r_5 = 0.4044$
$d_5 = 0.2789$ $n_3 = 1.69426$ $\nu_3 = 30.1$
$r_6 = 0.2729$
$d_6 = 0.2681$
$r_7 = -0.2129$
$d_7 = 0.3165$ $n_4 = 1.69426$ $\nu_4 = 30.1$
$r_8 = -0.4235$
$d_8 = 0.0458$
$r_9 = -44.5212$
$d_9 = 0.2232$ $n_5 = 1.61656$ $\nu_5 = 36.3$
$r_{10} = -0.987$
$f = 1, f_3 = -9.252, f_4 = -1.606$ $\Sigma P = 0.015, l = 0.175$ Embodiment 2

$r_1 = \infty$
$d_1 = 0.2825$ $n_1 = 1.51463$ $\nu_1 = 64.2$
$r_2 = -0.4723$
$d_2 = 0.025$
$r_3 = 0.8966$
$d_3 = 0.1969$ $n_2 = 1.51463$ $\nu_2 = 64.2$
$r_4 = -1.4074$
$d_4 = 0.1154$ $r_5 = 0.4002$
$d_5 = 0.2789$ $n_3 = 1.69426$ $\nu_3 = 30.1$
$r_6 = 0.2623$
$d_6 = 0.2681$
$r_7 = -0.2085$
$d_7 = 0.3079$ $n_4 = 1.69426$ $\nu_4 = 30.1$
$r_8 = -0.4192$
$d_8 = 0.0833$
$r_9 = -7.3497$
$d_9 = 0.2232$ $n_5 = 1.61656$ $\nu_5 = 36.3$
$r_{10} = -0.8788$
$f = 1, f_3 = -5.131, f_4 = -1.490$ $\Sigma P = 0.015, l = 0.175$ Embodiment 3

$r_1 = \infty$
$d_1 = 0.2825$ $n_1 = 1.51463$ $\nu_1 = 64.2$
$r_2 = -0.5232$
$d_2 = 0.025$
$r_3 = 0.9794$
$d_3 = 0.1969$ $n_2 = 1.51463$ $\nu_2 = 64.2$
$r_4 = -1.0976$
$d_4 = 0.1154$
$r_5 = 0.4027$
$d_5 = 0.2789$ $n_3 = 1.69426$ $\nu_3 = 30.1$
$r_6 = 0.2656$
$d_6 = 0.2681$
$r_7 = -0.2095$
$d_7 = 0.3079$ $n_4 = 1.69426$ $\nu_4 = 30.1$
$r_8 = -0.4211$
$d_8 = 0.0833$
$r_9 = -11.1307$
$d_9 = 0.2232$ $n_5 = 1.61656$ $\nu_5 = 36.3$
$r_{10} = -0.9144$
$f = 1, f_3 = -6.746, f_4 = -1.486$ $\Sigma P = 0.015, l = 0.175$ Embodiment 4

$r_1 = -2.0856$
$d_1 = 0.366$ $n_1 = 1.72309$ $\nu_1 = 28.5$
$r_2 = -0.6253$
$d_2 = 0.0623$
$r_3 = 0.7613$
$d_3 = 0.2258$ $n_2 = 1.60018$ $\nu_2 = 38.0$
$r_4 = 13.1246$
$d_4 = 0.0672$
$r_5 = 0.406$
$d_5 = 0.2349$ $n_3 = 1.60018$ $\nu_3 = 38.0$
$r_6 = 0.2756$
$d_6 = 0.3411$
$r_7 = -0.2656$
$d_7 = 0.3154$ $n_4 = 1.72309$ $\nu_4 = 28.5$
$r_8 = -0.538$
$d_8 = 0.0141$
$r_9 = -7.5535$
$d_9 = 0.1627$ $n_5 = 1.60018$ $\nu_5 = 38.0$
$r_{10} = -0.8135$
$f = 1, f_3 = -4.415, f_4 = -1.534$ $\Sigma P = 0.015, l = 0.21$ Embodiment 5

Figure 1:
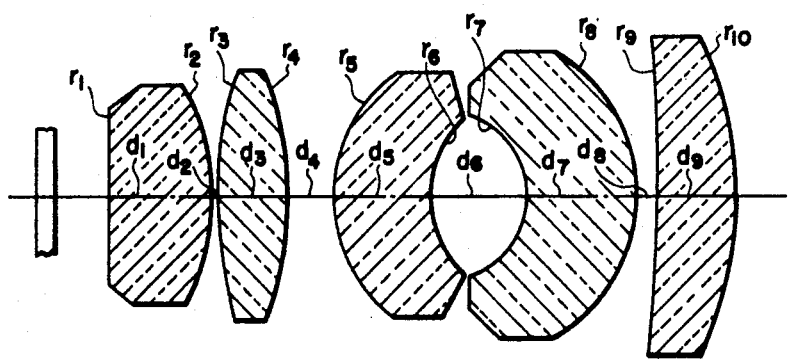
FIG. 1 shows a sectional view of Embodiments 1 through 3 of the objective according to the present invention.
Figure 5:
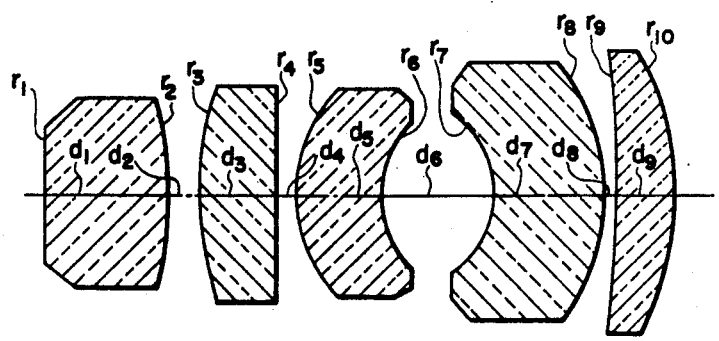
FIG. 5 shows a sectional view of Embodiments 4 and 5.

$r_1 = -2.8161$
$d_1 = 0.367$ $n_1 = 1.72309$ $\nu_1 = 28.5$
$r_2 = -0.6254$
$d_2 = 0.602$
$r_3 = 0.7658$
$d_3 = 0.227$ $n_2 = 1.60018$ $\nu_2 = 38.0$
$r_4 = 11.4344$
$d_4 = 0.0563$
$r_5 = 0.4057$
$d_5 = 0.2347$ $n_3 = 1.60018$ $\nu_3 = 38.0$
$r_6 = 0.2763$
$d_6 = 0.3424$
$r_7 = -0.2666$
$d_7 = 0.3164$ $n_4 = 1.72309$ $\nu_4 = 28.5$
$r_8 = -0.5258$
$d_8 = 0.0132$
$r_9 = -7.5383$
$d_9 = 0.1625$ $n_5 = 1.60018$ $\nu_5 = 38.0$
$r_{10} = -0.8161$
$f = 1, f_3 = -4.516, f_4 = -1.539$ $\Sigma P = 0.015, l = 0.212$ In the above-mentioned respective embodiments, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbol $f$ represents the focal length of the lens system as a whole, reference symbol $f_3$ represents the focal length of the third lens, reference symbol $f_4$ represents the focal length of the fourth lens, reference symbol $l$ represents the working distance of the lens system and reference symbol $\Sigma P$ represents Petzval's sum. Embodiments 1 through 3 have lens configuration as shown in FIG. 1. For these embodiments, the first lens surface $r_1$ is a planar surface. Embodiments 4 and 5 have lens configuration as shown in FIG. 5. For these embodiments, the first lens surface $r_1$ is a concave surface. As explained in the above, the lens system according to the present invention fully satisfies the requirements for a reproducing objective for video disks. This is also evident from favourable corrected aberrations shown in respective graphs of aberrations curves. As for astigmatism of respective embodiments, each graph looks as if it shows only one curve. This is because astigmatic difference is very small and, consequently, the curve of sagittal astigmatism almost coincides with the curve of meridional astigmatism. When astigmatic difference of a lens system is not very small, it is impossible to make the image flat over a wide field. If, in such case, true roundness of the video disk is low or tracks on the disk are eccentric, signals in different track will be read out because the size of tracks on the disk is in the order of micron and, consequently, an error will be caused. Therefore, in the present invention, astigmatic difference is made extremely small as shown in graphs of aberration curves.

We claim:

1. A reproducing objective for video disks comprising a first, second, third, fourth and fifth lenses, said first lens being a positive lens, said second lens being a positive lens, said third lens being a negative meniscus lens with its convex surface positioned toward the object side, said fourth lens being a negative meniscus lens with its concave surface positioned toward the object side, said fifth lens being a positive meniscus lens with its concave surface positioned toward the object side, said reproducing objective for video disks satisfying the following conditions:

1. $0.30 \geq r_6/f \geq 0.23$

2. $0.38 \geq d_1/f \geq 0.26$

3. $1.4 \geq r_6/|r_7| \geq 0.9$

4. $6.0 \geq |f_3|/|f_4| \geq 2.5$

5. $0.31 \geq d_5/f \geq 0.21$ wherein referemce symbol $f$ represents the focal length of the lens system as a whole, reference symbol $f_3$ represents the focal length of the third lens, reference symbol $f_4$ represents the focal length of the fourth lens, reference symbol $r_6$ represents the radius of curvature of the surface on the image side of the third lens, reference symbol $r_7$ represents the radius of curvature of the surface on the object side of the fourth lens, reference symbol $d_1$ represents the thickness of the first lens and reference symbol $d_5$ represents the thickness of the third lens.

2. A reproducing objective for video disks according to claim 1, in which said reproducing objective for video disks has the following numerical data:

$r_1 = \infty$
$\quad d_1 = 0.2825 \quad n_1 = 1.51463 \quad \nu_1 = 64.2$
$r_2 = -0.5927$
$\quad d_2 = 0.025$
$r_3 = 1.1536$
$\quad d_3 = 0.1969 \quad n_2 = 1.51463 \quad \nu_2 = 64.2$
$r_4 = -0.895$
$\quad d_4 = 0.1154$
$r_5 = 0.4044$
$\quad d_5 = 0.2789 \quad n_3 = 1.69426 \quad \nu_3 = 30.1$
$r_6 = 0.2729$
$\quad d_6 = 0.2681$
$r_7 = -0.2129$
$\quad d_7 = 0.3165 \quad n_4 = 1.69426 \quad \nu_4 = 30.1$
$r_8 = -0.4235$
$\quad d_8 = 0.0458$
$r_9 = -44.5212$
$\quad d_9 = 0.2232 \quad n_5 = 1.61656 \quad \nu_5 = 36.3$
$r_{10} = -0.987$
$\quad f = 1, f_3 = -9.252, f_4 = -1.606 \quad \Sigma P = 0.015, l = 0.175$ Wherein reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbol $f$ represents the focal length of the lens system as a whole, reference symbol $f_3$ represents the focal length of the third lens, reference symbol $f_4$ represents the focal length of the fourth lens, reference symbol $l$ represents the working distance of the lens system and reference symbol $\Sigma P$ represents Petzval's sum.

3. A reproducing objective for video disks according to claim 1, in which said reproducing objective for video disks has the following numerical data:

$r_1 = \infty$
$\quad d_1 = 0.2825 \quad n_1 = 1.51463 \quad \nu_1 = 64.2$
$r_2 = -0.4723$
$\quad d_2 = 0.025$
$r_3 = 0.8966$
$\quad d_3 = 0.1969 \quad n_2 = 1.51463 \quad \nu_2 = 64.2$
$r_4 = -1.4074$
$\quad d_4 = 0.1154$
$r_5 = 0.4002$
$\quad d_5 = 0.2789 \quad n_3 = 1.69426 \quad \nu_3 = 30.1$
$r_6 = 0.2623$
$\quad d_6 = 0.2681$
$r_7 = -0.2085$
$\quad d_7 = 0.3079 \quad n_4 = 1.69426 \quad \nu_4 = 30.1$
$r_8 = -0.4192$
$\quad d_8 = 0.0833$
$r_9 = -7.3497$
$\quad d_9 = 0.2232 \quad n_5 = 1.61656 \quad \nu_5 = 36.3$
$r_{10} = -0.8788$
$\quad f = 1, f_3 = -5.131, f_4 = -1.490$
$\quad \Sigma P = 0.015, l = 0.175$ Wherein reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbol $f$ represents the focal length of the lens system as a whole, reference symbol $f_3$ represents the focal length of the third lens, reference symbol $f_4$ represents the focal length of the fourth lens, reference symbol $l$ represents the working distance of the lens system and reference symbol $\Sigma P$ represents Petzval's sum.

4. A reproducing objective for video disks according to claim 1, in which said reproducing objective for video disks has the following numerical data:

$r_1 = \infty$
$\quad d_1 = 0.2825 \ n_1 = 1.51463 \ \nu_1 = 64.2$
$r_2 = -0.5232$
$\quad d_2 = 0.025$
$r_3 = 0.9794$
$\quad d_3 = 0.1969 \ n_2 = 1.51463 \ \nu_2 = 64.2$
$r_4 = -1.0976$
$\quad d_4 = 0.1154$
$r_5 = 0.4027$
$\quad d_5 = 0.2789 \ n_3 = 1.69426 \ \nu_3 = 30.1$
$r_6 = 0.2656$
$\quad d_6 = 0.2681$
$r_7 = -0.2095$
$\quad d_7 = 0.3079 \ n_4 = 1.69426 \ \nu_4 = 30.1$
$r_8 = -0.4211$
$\quad d_8 = 0.0833$
$r_9 = -11.1307$
$\quad d_9 = 0.2232 \ n_5 = 1.61656 \ \nu_5 = 36.3$
$r_{10} = -0.9144$
$\quad f = 1, f_3 = -6.746, f_4 = -1.486$
$\quad \Sigma P = 0.015, l = 0.175$ Wherein reference symbols $r_1$ through $r_{10}$ respectively represent radii of curvature of respective lens surface, reference symbols $d_1$ through $d_9$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbol $f$ represents the focal length of the lens system as a whole, reference symbol $f_3$ represents the focal length of the third lens, reference symbol $f_4$ represents the focal length of the fourth lens, reference symbol $l$ represents the working distance of the lens system and reference symbol $\Sigma P$ represents Patzval's sum.

5. A reproducing objective for video disks according to claim 1, in which said reproducing objective for video disks has the following numerical data:

$r_1 = -2.0856$
$\quad d_1 = 0.366 \ n_1 = 1.72309 \ \nu_1 = 28.5$
$r_2 = -0.6253$
$\quad d_2 = 0.0623$
$r_3 = 0.7613$
$\quad d_3 = 0.2258 \ n_2 = 1.60018 \ \nu_2 = 38.0$
$r_4 = 13.1246$
$\quad d_4 = 0.0672$
$r_5 = 0.406$
$\quad d_5 = 0.2349 \ n_3 = 1.60018 \ \nu_3 = 38.0$
$r_6 = 0.2756$
$\quad d_6 = 0.3411$
$r_7 = -0.2656$
$\quad d_7 = 0.3154 \ n_4 = 1.72309 \ \nu_4 = 28.5$
$r_8 = -0.538$
$\quad d_8 = 0.0141$
$r_9 = -7.5535$
$\quad d_9 = 0.1627 \ n_5 = 1.60018 \ \nu_5 = 38.0$
$r_{10} = -0.8135$
$\quad f = 1, f_3 = -4.415, f_4 = -1.534$
$\quad \Sigma P = 0.015, l = 0.21$ Wherein reference symbols $r_1$ through $r_{10}$ respectively represent radii of curvature of respective lens surface, reference symbols $d_1$ through $d_9$ respectively represent thicknesses of respective lenses and air spaces between respective lenses, reference symbols $n_1$ through $n_5$ respectively represent refrative indices of respective lenses, reference symbols $\nu_1$ through $\nu_5$ respectively represent Abbe's numbers of respective lenses, reference symbol $f$ represents the focal length of the lens system as a whole, reference symbol $f_3$ represents the focal length of the third lens, reference symbol $f_4$ represents the focal length of the fourth lens, reference symbol $l$ represents the working distance of the lens system and reference symbol $\Sigma P$ represents Petzval's sum.

6. A reproducing objective for video disks according to claim 1, in which said reproducing objective for video disks has the following numerical data:

$r_1 = -2.8161$
$\quad d_1 = 0.367 \ n_1 = 1.72309 \ \nu_1 = 28.5$
$r_2 = -0.6254$
$\quad d_2 = 0.602$
$r_3 = 0.7658$
$\quad d_3 = 0.227 \ n_2 = 1.60018 \ \nu_2 = 38.0$
$r_4 = 11.4344$
$\quad d_4 = 0.0563$
$r_5 = 0.4057$
$\quad d_5 = 0.2347 \ n_3 = 1.60018 \ \nu_3 = 38.0$
$r_6 = 0.2763$
$\quad d_6 = 0.3424$
$r_7 = -0.2666$
$\quad d_7 = 0.3164 \ n_4 = 1.72309 \ \nu_4 = 28.5$
$r_8 = -0.5258$
$\quad d_8 = 0.0132$
$r_9 = -7.5383$
$\quad d_9 = 0.1625 \ n_5 = 1.60018 \ \nu_5 = 38.0$
$r_{10} = -0.8161$
$\quad f = 1, f_3 = -4.516, f_4 = -1.539$
$\quad \Sigma P = 0.015, l = 0.212$ In the above-mentioned respective embodiments, reference symbols $r_1$ through $r_{10}$ respectively represent radii of curvature of respective lens surfaces, reference symbols $d_1$ through $d_9$ respectively represent thicknesses of respective lenses and air spaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbol $f$ represents the focal length of the lens system as a whole, reference symbol $f_3$ represents the focal length of the third lens, reference symbol $f_4$ represents the focal length of the fourth lens, reference symbol $l$ represents the working distance of the lens system and reference symbol $\Sigma P$ represents Petzval's sum.

* * * * *